(12) United States Patent
Cho et al.

(10) Patent No.: US 6,396,984 B1
(45) Date of Patent: May 28, 2002

(54) MODE SHAPE CONVERTER, METHOD FOR FABRICATING THE MODE SHAPE CONVERTER AND INTEGRATED OPTICAL DEVICE USING THE MODE SHAPE CONVERTER

(75) Inventors: Jung-Hwan Cho, Seoul; Duk-Bong Kim, Pusankwangyok-shi; Sang-Yun Yi, Yongin-shi; Tae-Hyung Rhee, Songnam-shi, all of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/488,571

(22) Filed: Jan. 21, 2000

(30) Foreign Application Priority Data

Jan. 21, 1999 (KR) .............................................. 99-1764

(51) Int. Cl.⁷ .................................................. G02B 6/26

(52) U.S. Cl. .............................. 385/43; 385/28; 385/50

(58) Field of Search ............................... 385/15, 27–29, 385/31, 39, 43, 48–50

(56) References Cited

U.S. PATENT DOCUMENTS

| 5,078,516 | A |   | 1/1992  | Kapon et al. ............... 385/129 |
| 5,142,596 | A |   | 8/1992  | Mizuuchi et al. ............. 385/43 |
| 5,391,869 | A |   | 2/1995  | Ade et al. .............. 250/227.24 |
| 5,910,012 | A |   | 6/1999  | Takeuchi ..................... 438/31 |
| 5,917,974 | A | * | 6/1999  | Tavlykaev et al. ............ 385/50 |
| 6,162,655 | A | * | 12/2000 | Johnson et al. ............... 438/31 |

* cited by examiner

Primary Examiner—John D. Lee
(74) Attorney, Agent, or Firm—Robert E. Bushnell, Esq.

(57) ABSTRACT

A mode shape converter, interposed between an input or output terminal of a function executing unit included in an optical device and an optical fiber and adapted to couple a mode of the optical fiber with a mode of the input or output terminal of the function executing unit, includes a substrate, a lower clad coated over the substrate, the lower clad having an etched portion in a desired region, a lower rib waveguide formed on the etched portion of the lower clad, a core. formed over both the lower rib waveguide and a non-etched portion of the lower clad, an upper rib waveguide formed on the core such that it is aligned with the lower rib waveguide, the upper rib waveguide having a desired shape, and an upper clad formed over both the upper rib waveguide and a portion of the core not covered with the upper rib waveguide.

18 Claims, 10 Drawing Sheets

FIG.2a
(PRIOR ART)
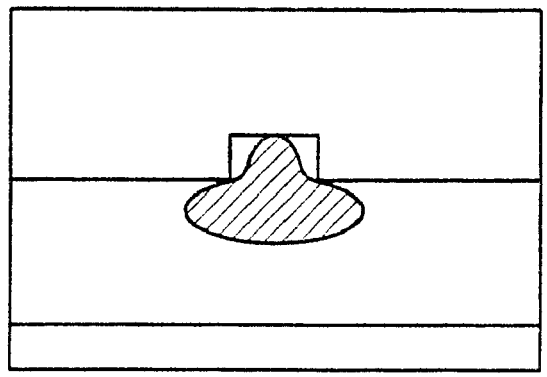
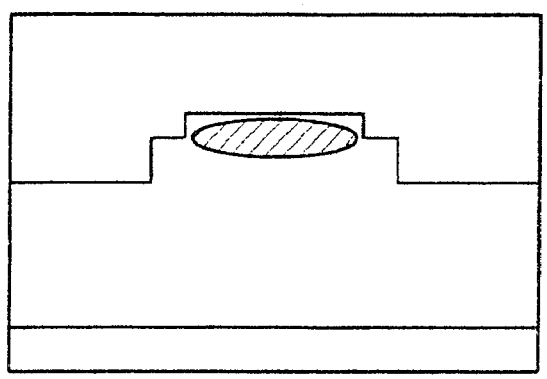
FIG.2b
(PRIOR ART)

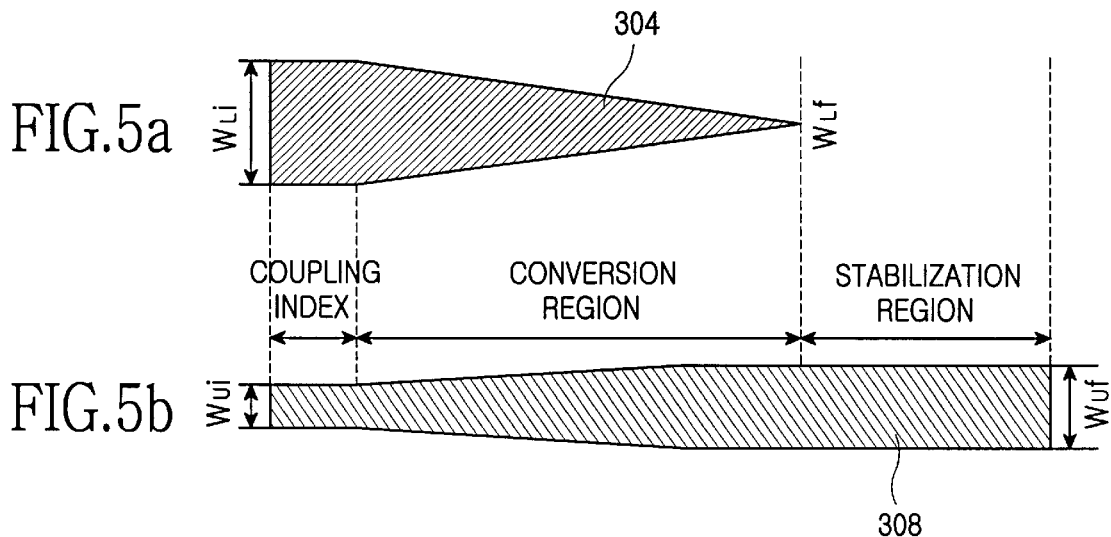
FIG.5a
FIG.5b
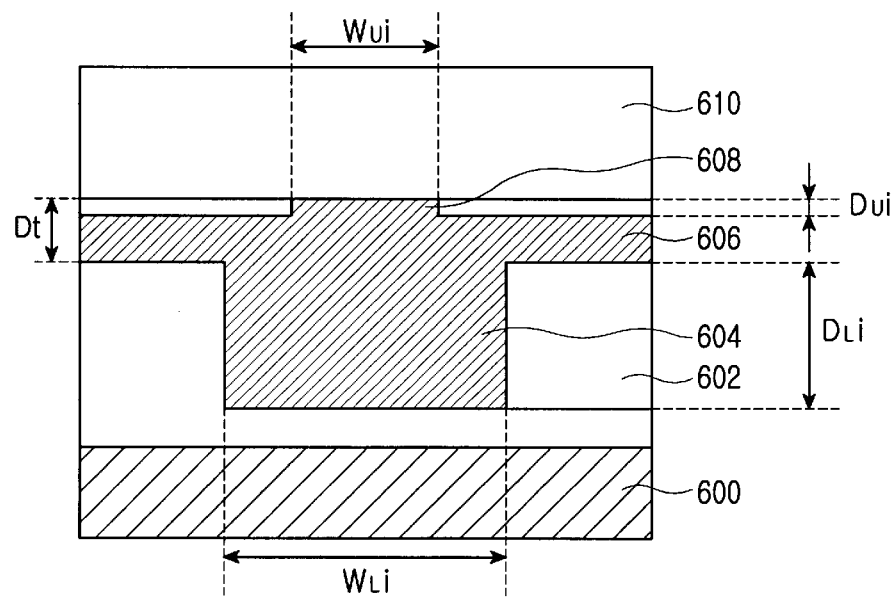
FIG.6

MODE SHAPE CONVERTER, METHOD FOR FABRICATING THE MODE SHAPE CONVERTER AND INTEGRATED OPTICAL DEVICE USING THE MODE SHAPE CONVERTER

CLAIM OF PRIORITY

This application makes reference to, incorporates the same herein, and claims all benefits accruing under 35 U.S.C §119 from an application; entitled Mode Shape Converter, Method For Fabricating the Mode Shape Converter And Integrated Optical Device Using The Mode Shape Converter earlier filed in the Korean Industrial Property Office on Jan. 21 1999, and there duly assigned Serial No. 99-1764 by that Office.

BACKGROUND OF THE INVENTION

1. Field of the Invention

The present invention relates to a mode shape converter, a method for fabricating the mode shape converter, and an integrated optical device using the mode shape converter, and more particularly to a mode shape converter arranged at an input or output terminal of an optical device and adapted to couple lights inputted into or outputted from the optical device via optical fibers. The present invention also relates to a method for fabricating such a mode shape converter, and an integrated optical device using the mode shape converter.

2. Description of the Prior Art

An integrated optical technique is a technique for integrating a variety of optical devices using waveguides on one substrate. Using such an integrated optical technique, it is possible to easily integrate a multi-functional optical device having a complicated structure on a limited small area because the alignment of unit optical devices can be easily made.

Examples, incorporated by reference herein, of waveguide structure implementing an integrated optical device are disclosed in U.S. Pat. No. 5142,596 to Kiminori Mizuuchi et al. entitled Tapered Light Wave guide And Wavelength Converting Element Using Tile Same; U.S. Pat. No. 5,391,869 to Robert W. Ade et al. entitled Single-Side Growth Reflection-Based Waveguide-Integrated Photodetector; U.S. Pat. No. 5,910,012 to Takeshi Takeuchi entitled Waveguide Type Semiconductor Photodetecting Device Method For Fabricating; and U.S. Pat. No. 5,078,516 to Elyahou Kapon et al. entitled Tapered Rib Waveguides.

A rib waveguide is a channel waveguide fabricated by partially etching a planar waveguide. Such rib waveguides have various advantages as follows. First, it is possible to select respective refractive indices of a core and a clad within a wide range. Second, it is possible to fabricate a single-mode waveguide having a large cross-sectional area irrespective of a refractive index difference between the core and clad. Third, it is possible to easily adjust optical characteristics such as a mode distribution and a propagation constants under the condition in which an etched depth is used as a major process parameter. Fourth, a precise pattern can be obtained, as compared to rectangular waveguides. This is because the etched depth in the rib waveguide is less than those of the rectangular waveguides. Fifth, it is possible to reduce damages occurring during an etching process for a core layer, for example, errors in pattern size caused by an anisotropic etching, a cracking phenomenon occurring during the etching process for a layer having stresses, and damages caused by a re-accumulation of by-products formed during the etching process.

In spite of such advantages, the above mentioned rib waveguide has a disadvantage in that a very large coupling loss is generated when an optical fiber is coupled to the waveguide of the optical device. Single-mode optical fibers have a circular mode distribution having an aspect ratio of 1:1 while having a relatively large size, for example, about 10 $\mu$m. On the other hand, rib waveguides have an oval mode distribution in which its horizontal width is larger than its vertical width. In many cases, the mode distribution size of such a rib waveguide is also larger than those of the single mode optical fibers. For this reason, there is a misalignment in mode shape at the connection between a rib waveguide and an optical fiber. Due to such a mode shape misalignment, an optical wave encounters with a discontinuity while passing through the connection, so that it involves a coupling loss while being reflected or scattered. In order to solve this problem, a mode shape converter is arranged at the input or output terminal of the integrated optical device to which an optical fiber is coupled. The mode shape converter serves to conduct the function for slowly converting the mode of the optical fiber into a mode shape suitable for execution of the functions of the optical device, thereby achieving a reduction in coupling loss.

FIG. 1 is a perspective view illustrating the structure of a conventional mode shape converter disclosed in U.S. Pat. No. 5,078,516. She mode shape converter shown in FIG. 1 includes a first waveguide 100, a second waveguide 102, and a substrate 104. In FIG. 1, the reference numeral 106 denotes an input terminal whereas the reference numeral 108 denotes an output terminal. The reference numeral 110 represents respective refractive indices of the first waveguide 100, second waveguide 102, and substrate 104. The first waveguide 100 is designed to have a small mode size suitable for execution of the functions of an optical device to which the mode shape converter is coupled. The second waveguide 102 is designed to have a refractive index less than that of the first waveguide 100 while having a large mode size to obtain an advantageous input/output coupling with an optical fiber. The input terminal 106 has a waveguide constituted only by the second waveguide 102. This second waveguide 102 uses air as its upper clad while using the substrate 104 as its lower clad in order to confine optical waves in a depth direction. In order to confine optical waves in a longitudinal direction, the second waveguide 102, which serves as a core, is partially etched to have a rib waveguide structure.

The output terminal 108 has a waveguide constituted only by the first waveguide 100. The first waveguide 100 of the output terminal 108 has a strip loaded waveguide structure different from the rib waveguide structure of the input terminal 106. The first waveguide 100 uses air as its upper clad while using the second waveguide 102 as its lower clad.

A mode conversion region is defined between the input and output terminals 106 and 108 in order to convert a mode coupled after being inputted from the optical fiber to the optical device into a mode shape suitable for execution of the functions of the optical device without any loss of the coupled mode. The rib waveguide having a large mode size is converted into the strip loaded waveguide having a small mode size by the mode conversion region. A light guided through the mode shape converter is slowly shifted toward the first waveguide 100 because the first waveguide 100 has a refractive index higher than that of the second waveguide 102 even though the widths of both the first and second waveguides 100 and 102 increase. When the guided light reaches the output terminal 108, the power thereof is mainly concentrated toward the first waveguide 100.

FIG. 2a is a diagram illustrating a mode profile of the input terminal 106 in the above mentioned mode shape converter whereas FIG. 2b is a diagram illustrating a mode profile of the output terminal 108 in the mode shape converter.

However, the integrated optical device provided with the above mentioned mode shape converter has problems as follows. First, the fabrication is troublesome because it is necessary to use two cores made of different materials, and the first waveguide should be precisely formed on the second waveguide. Second, there is a limitation in minimizing the coupling loss of the optical device to an optical fiber having a circular mode because the input terminal 106 has a rib waveguide structure having an oval waveguide mode even though it has a large mode size. Third, since the mode shape converter uses a down-tapering structure in order to increase the mode size of the input-end waveguide, its waveguide taper increases in length. An increase in transmission loss occurs during the mode conversion.

SUMMARY OF THE INVENTION

Therefore, an object of the invention is to provide a mode shape converter including a double waveguide made of a single medium while having an up-tapering structure, a method for fabricating the mode shape converter, and an integrated optical device using the mode shape converter.

In accordance with one aspect, the present invention provides a mode shape converter interposed between an input or output terminal of a function executing unit included in an optical device and an optical fiber and adapted to couple a mode of the optical fiber with a mode of the input or output terminal of the function executing unit comprising: a substrate; a lower clad coated over the substrate, the lower clad having an etched portion in a desired region; a lower rib waveguide formed on the etched portion of the lower clad; a core formed over both the lower rib waveguide and a non-etched portion of the lower clad; an upper rib waveguide formed on the core in such a fashion that it is aligned with the lower rib waveguide, the upper rib waveguide having a desired shape; and an upper clad formed over both the upper rib waveguide and a portion of the core not covered with the upper rib waveguide.

In accordance with another aspect, the present invention provides a method for fabricating a mode shape converter interposed between an input or output terminal of a function executing unit included in an optical device and an optical fiber and adapted to couple a mode of the optical fiber with a mode of the input or output terminal of the function executing unit comprising: (a) coating a lower clad over a substrate; (b) patterning an etch mask on the lower clad, and etching the lower clad to a desired depth using the resultant pattern of the etch mask; (c) coating a core layer over the etched lower clad, thereby forming a lower rib waveguide and a core; (d) patterning another etch mask on the core, and etching the core using the resultant pattern of the another etch mask, thereby forming an upper rib waveguide; and (e) coating an upper clad on the core and the upper rib waveguide.

In accordance with another aspect, the present invention provides an integrated optical device including a function executing unit coupled to optical fibers at input and output terminals thereof, respectively, a first mode shape converter arranged at the input terminal of the function executing unit and adapted to convert an input optical fiber mode into a mode suitable for execution of desired functions of the optical device, and a second mode shape converter arranged at the output terminal of the function executing unit and adapted to convert a mode outputted from the function executing unit into an optical fiber mode, the output-end mode shape converter having an arrangement reverse to that of the first mode shape converter, wherein each of the first and second mode shape converter comprises: a substrate; a lower clad coated over the substrate, the lower clad having an etched portion in a desired region; a lower rib waveguide formed on the etched portion of the lower clad; a core formed over both the lower rib waveguide and a non-etched portion of the lower clad; an upper rib waveguide formed on the core in such a fashion that it is aligned with the lower rib waveguide, the upper rib waveguide having a desired shape; and an upper clad formed over is both the upper rib waveguide and a portion of the core not covered with the upper rib waveguide.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components. wherein:

FIG. 2a is a diagram illustrating a mode profile of the input terminal in the mode shape converter shown in FIG. 1;

FIG. 2b is a diagram illustrating a mode profile of the output terminal in the mode shape converter shown in FIG. 1;

FIGS. 5a and 5b are plan views respectively illustrating lower and upper rib waveguides shown in FIG. 3;

FIG. 6 is a cross-sectional view illustrating a coupling region of the mode shape converter according to the present invention;

DETAILED DESCRIPTION OF THE PREFERRED EMBODIMENT

Hereinafter, preferred embodiments of the present invention will be described in detail, in conjunction with the annexed drawings.

Figure 1:
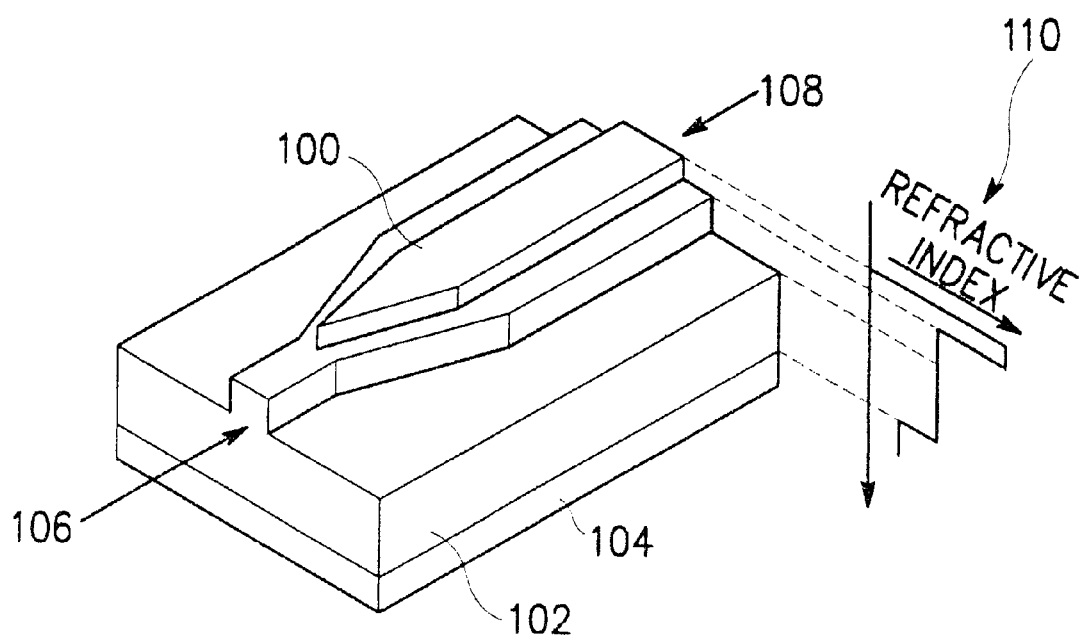
FIG. 1 is a perspective view illustrating the structure of a conventional mode shape converter.
Figure 3:
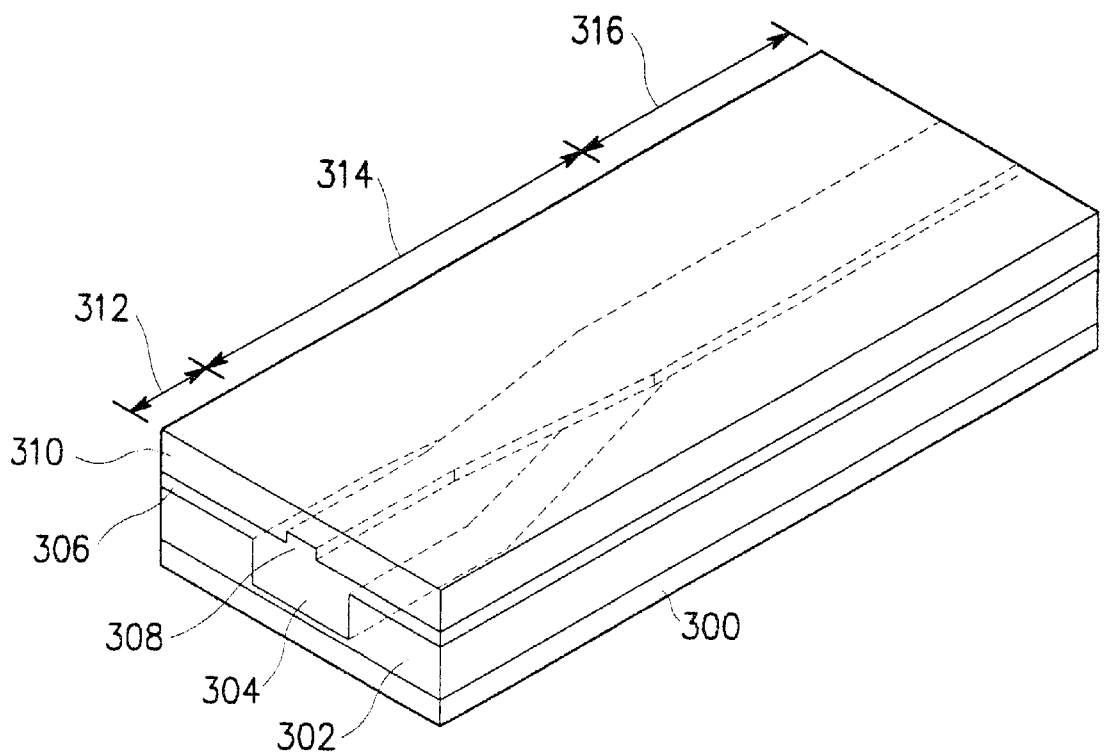
FIG. 3 is a perspective view illustrating the structure of a mode shape converter according to the present invention.

FIG. 3 is a perspective view illustrating the structure of a mode shape converter according to the present invention.

The mode shape converter of FIG. 3 includes a substrate 300, a lower clad 302, a lower rib waveguide 304, a core 306, an upper rib waveguide 308, and an upper clad 310. In FIG. 3, the reference numeral 312 denotes a coupling region, 314 a conversion region, and 316 a stabilization region. The lower rib waveguide 304, core 306, and upper rib waveguide 308 are made of the same material.

Figure 4A:
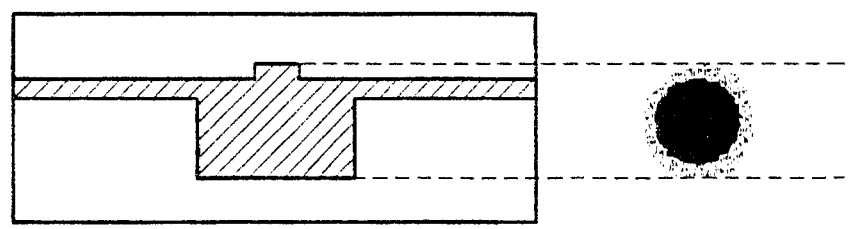
FIGS. 4a, 4b and 4c are diagrams illustrating respective cross-sectional shapes of regions shown in FIG. 3 along with respective mode profiles in those regions.
Figure 4B:
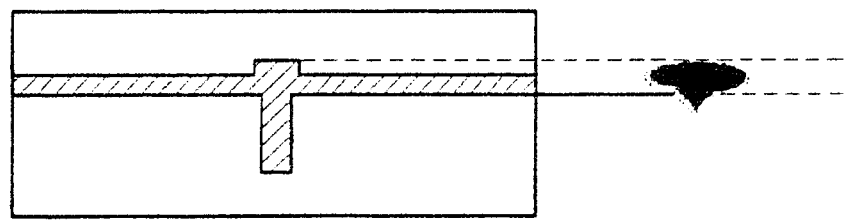
Figure 4C:
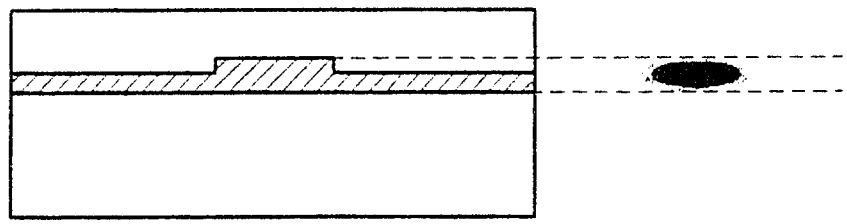

FIGS. 4a, 4b and 4c are diagrams illustrating respective cross-sectional shapes of the coupling region 312, conversion region 314, and stabilization region 316 shown in FIG. 3 along with respective mode profiles in those regions. Referring to FIGS. 4a to 4c, it can be found that the circular mode of the coupling region 312 connected to an optical fiber is gradually converted into an oval shape while passing though the conversion region 314. After passing though the stabilization region 316, the mode is converted into an oval mode suitable for execution of the functions of an optical device to which the mode shape converter is applied.

FIGS. 5a and 5b are plan views respectively illustrating the lower rib waveguide 304 and upper rib waveguide 308 shown in FIG. 3. In FIGS. 5a and 5b, "$W_{Li}$" and "$W_{Ui}$" represent respective input-end widths of the lower and upper rib waveguides whereas "$W_{Lf}$" and "$W_{Uf}$" represent respective output-end widths of the lower and upper rib waveguides. Referring to FIGS. 5a and 5b, it can be found that each waveguide has a structure varying in accordance with each region thereof. That is, the lower rib waveguide 304 has a width decreasing gradually to 0 whereas the upper rib waveguide 308 has a width increasing gradually to a width suitable for execution of the functions of the optical device. Herein, the functions of the optical device include modulation, switching or filtering of optical waves. The coupling region 312 is a region where the mode shape converter is coupled to an optical fiber. This coupling region 312 is designed to have a mode having the same size and shape as those of the mode of the optical fiber. This coupling region has a double rib waveguide structure having a core made of a single medium. This double rib waveguide structure includes two waveguides one being the upper rib waveguide 308 while the other waveguide being the lower rib waveguide 304 arranged beneath the upper rib waveguide 308 in an inverted state. The upper rib waveguide 308 is connected to a function executing unit of the optical device. The lower rib waveguide 304 has a width and a depth adjusted to allow the fundamental mode of the double rib waveguide to well coincide with the circular mode of the optical fiber.

The conversion region is a region in which optical waves coupled in the coupling region 312 are converted into a mode shape suitable for execution of the functions of the optical device. This conversion region is designed to satisfy adiabatic conditions in order to minimize the radiation loss generated during the conversion. In the conversion region, the lower rib waveguide 304 decreases gradually in width as it extends longitudinally, thereby causing the circular mode of the coupling region to be converted into an oval rib waveguide mode suitable for execution of the functions of the optical device. As the width of the lower rib waveguide 304 decreases gradually, the power of light waves confined in the lower rib waveguide 304 decreases gradually. As a result, the light waves migrate to the upper rib waveguide 308. Respective width variations of the lower and upper rib waveguides 304 and 308 are designed to minimize the radiation loss. Here, the conversion region of the upper rib waveguide gradually increases from the width $W_{Ui}$ to the width $W_{Uf}$ prior to reaching the stabilization region.

The stabilization region 316 serves to remove higher-order modes generated during the mode conversion, thereby transmitting a mode suitable for execution of the functions of the optical device to the function executing unit of the optical device. This stabilization region 316 is constituted only by the upper rib waveguide 308. The stabilization region 316 allows only the mode of the converted optical waves suitable for execution of desired functions while radiating the remaining higher-order modes to the substrate.

The mode shape converter having the above mentioned structure is fabricated in accordance with the following design. The present invention takes into consideration a rib waveguide having an oval mode shape. The structure of the input-end waveguide is then determined which coincides with the mode shape of the optical fiber. Where the area of the input-end waveguide is reduced to make the mode shape of the waveguide coincide with the mode shape of the optical fiber, as in the down-tapering method, it is difficult to achieve an efficient input coupling even when a small variation in the cross-sectional shape of the optical waveguide occurs.

Accordingly, a waveguide structure having a large cross-sectional area is designed, as in the up-tapering method, in order to achieve an efficient input coupling and to increase an error tolerance of the waveguide cross-sectional shape. In accordance with the present invention, a double is rib waveguide structure is fabricated which includes a single rib waveguide (upper rib waveguide), and an inverted rib waveguide (lower rib waveguide) arranged beneath the upper rib waveguide while having a large cross-sectional area, so that it has a mode having a large mode size and a circular mode shape.

Thereafter, a waveguide taper is designed which connects the input and output terminals. In order to convert a large circular mode into an oval mode, it is necessary to form a taper extending in a depth direction. In accordance with the present invention, the lower and upper rib waveguides 304 and 308 are designed in such a fashion that the tapering effect in the depth direction is obtained even though only a tapering in a width direction is made. When the width of the lower rib waveguide 304 is gradually reduced, the optical waves traveling along the lower rib waveguide 304 migrate gradually in an upward direction to the upper rib waveguide 308. Respective width variations of the upper and lower rib waveguides 308 and 304 are determined to minimize the radiation loss generated during the mode conversion.

The design for the cross section of the mode shape converter is conducted as follows. FIG. 6 is a cross-sectional view illustrating the coupling region of the mode shape converter according 16 to the present invention. In FIG. 6, the reference numeral 600 denotes a substrate, 602 a lower clad, 604 a lower rib waveguide, 606 a core, 608 an upper rib waveguide, and 610 an upper clad. "$W_{Ui}$" represents the input-end width of the upper rib waveguide 608, "$D_t$" the thickness of the core 606, "$D_{Ui}$" the etched depth for formation of the upper rib waveguide 608, "$D_{Li}$" the etched depth for formation of the lower rib waveguide 604, and "$W_{Li}$" the input-end width of the lower rib waveguide 604. These parameters can be determined as follows.

For example, where the upper rib waveguide is designed to have a structure suitable for execution of the functions of the optical device by determining the parameters $D_t$, $D_{Ui}$, and $W_{Uf}$, the remaining parameters $W_{Li}$, $D_{Li}$, and $W_{Ui}$ can be determined using the following Expression 1. The coupling efficiency can be derived by an overlap integral of the mode of the double rib waveguide with the mode of the optical fiber. The overlap integral is expressed by the following Expression 1 in accordance with a coupled mode theory.

$$\frac{\int_{-\infty}^{+\infty}\int_{-\infty}^{+\infty} E_{Coupling\ Region}(x,y) \cdot E^*_{Coupling\ Region}(x,y)\,ds}{\int_{-\infty}^{+\infty}\int_{-\infty}^{+\infty} E_{Optical\ Fiber}(x,y) \cdot E^*_{Optical\ Fiber}(x,y)\,ds} \quad \text{Expression 1}$$

where, $E_{Optical\ Fiber}$ and $E_{Coupling\ Region}$ represent respective mode distributions of the optical fiber and coupling region.

In accordance with the above Expression 1, when the above two mode distributions are identical to each other and accurately aligned with each other, the overlap integral value is 1. A mode shape converter is fabricated using the patterns and etched depths of the lower and upper rib waveguides fabricated in accordance with the above mentioned design.

FIGS. 7a to 7g illustrate a method for fabricating the above mentioned mode shape converter in accordance with the present invention. For the material of the mode shape converter, a semiconductor material such as Si, GaAs or InP, a dielectric material such as $LiNbO_3$, or a polymer may be used.

Figure 7A:
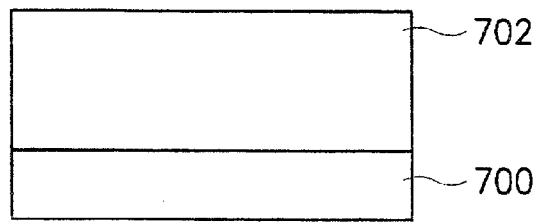
FIGS. 7a to 7g are cross-sectional views respectively illustrating sequential processing steps of a method for fabricating the mode shape converter in accordance with the present invention.
Figure 7B:
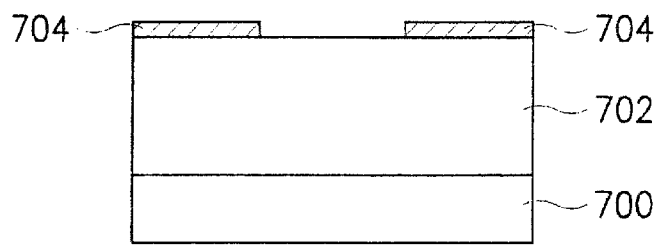
Figure 7C:
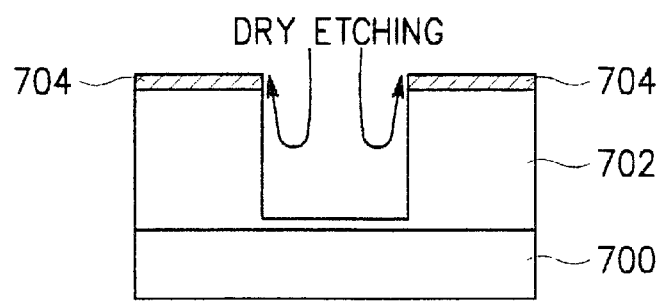
Figure 7D:
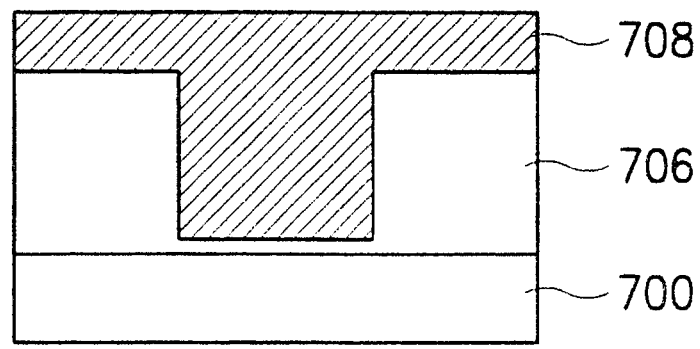
Figure 7E:
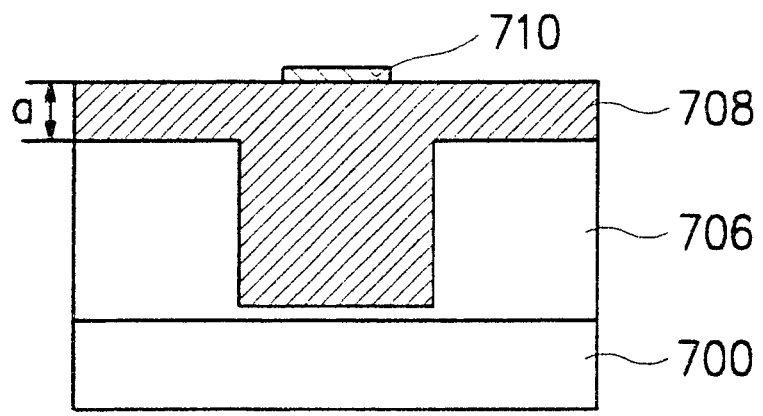
Figure 7F:
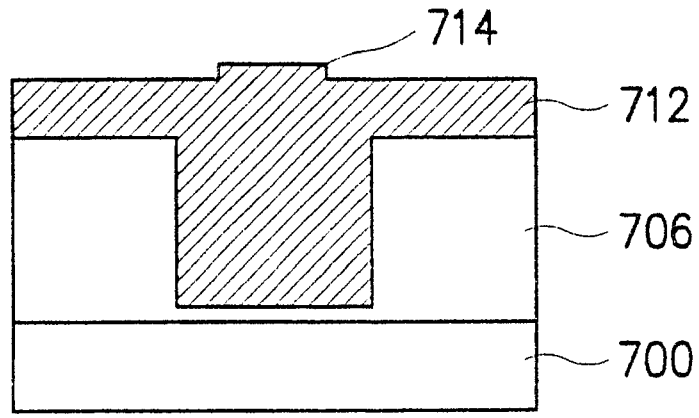
Figure 7G:
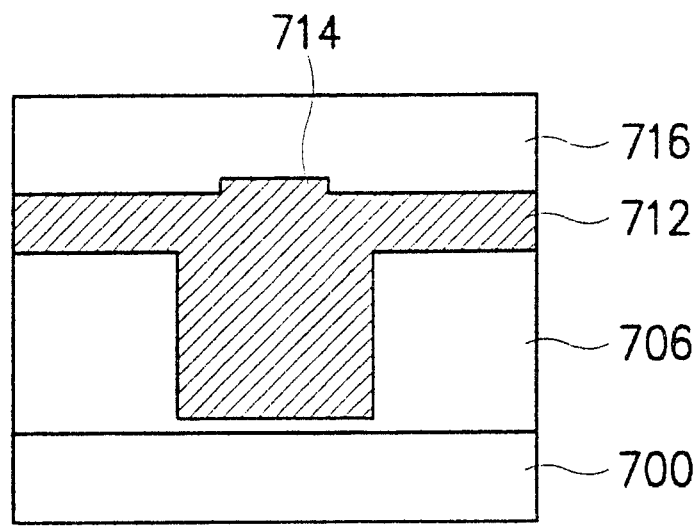

The method illustrated in FIGS. 7a to 7g corresponds to the case in which a polymer is used to fabricate the mode shape converter. In accordance with this method, a polymer is first coated over a silicon substrate 700, thereby forming a lower clad 702, as shown in FIG. 7a. An etch mask pattern 704 is then formed on the lower clad 702 in accordance with a photolithography using a dark field mask in order to form a lower rib waveguide, as shown in FIG. 7b. The lower clad 702 is then dry-etched to a desired depth using the etch mask pattern 704, as shown in FIG. 7c. Thereafter, a polymer is coated over the etched lower clad 706, thereby forming a core 708, as shown in FIG. 7d. In order to form an upper rib waveguide, a bright field mask is then aligned with the lower rib waveguide. Using the bright field mask, an etch mask pattern 710 is formed in accordance with a photolithography, as shown in FIG. 7e. Using the etch mask pattern 710, the core 708 is then dry-etched to a depth determined in the above procedure, thereby forming an etched core 712 and an upper rib waveguide 714, as shown in FIG. 7f. A polymer is then coated over the core 712 and upper rib waveguide 714, thereby forming an upper clad 716, as shown in FIG. 7g.

Figure 8A:
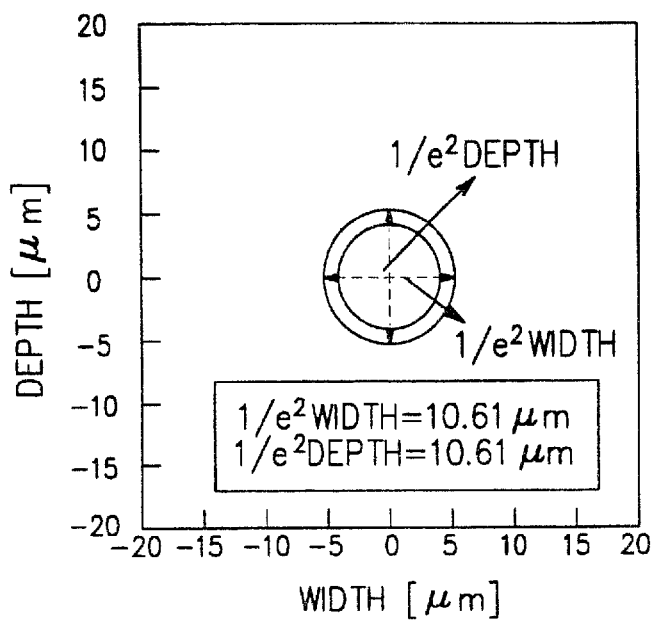
FIGS. 8a and 8b are diagrams respectively illustrating the mode of an optical fiber and the mode of a double rib waveguide according to the present invention.
Figure 8B:
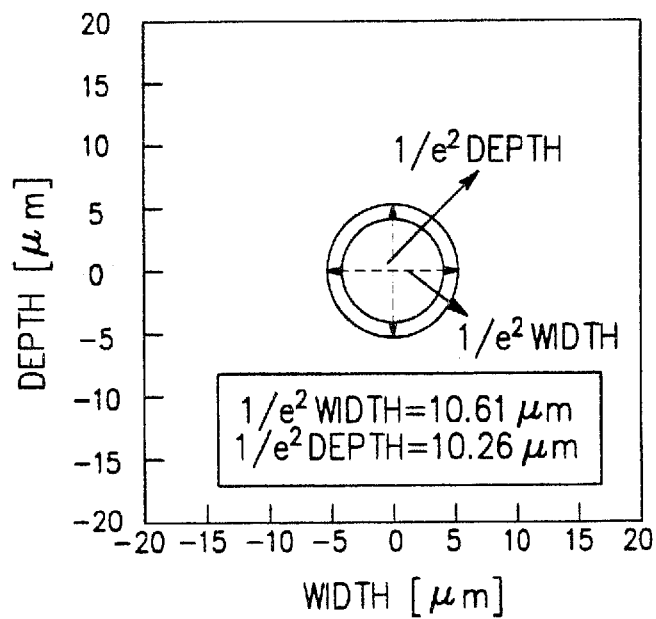

FIGS. 8a and 8b respectively illustrates the mode of the optical fiber and the mode of the double rib waveguide according to the present invention. In order to determine the degree of the coupling between the optical fiber and the double rib waveguide, the coupling efficiency of the mode shape converter was calculated in accordance with a cross section mode analysis method using a finite difference method while using the above mentioned overlap integral Expression 1 in accordance with the present invention.

In the case of the optical fiber mode shown in FIG. 8a, the core and clad of the optical fiber have refractive indices of 1.461 and 1.457 (specific refractive index$\Delta n=0.27\%$). The core of the optical fiber has a diameter of 9 $\mu$m. The mode of the optical fiber is a circular mode in that both the $1/e^2$ width and $1/e^2$ depth of the intensity of optical waves are 10.61 $\mu$m at a wavelength of 1.55 $\mu$m.

The parameters, FIG. 8b, of the double rib waveguide used in the numeric simulation are as follows. Respective refractive indices of the core and clad are 1.5337 and 1.5169 (specific refractive index $\Delta n=1.2\%$). The width of the upper rib waveguide, $W_{Uf}$ is 5 $\mu$m, the etched depth $D_{Ui}$ is 1.5 $\mu$m, and the thickness of the core, $D_r$, is 4.0 $\mu$m. The width WLi and etched depth DLi of the lower rib waveguide exhibiting a maximum coupling efficiency are derived by conducting a calculation for the coupling efficiency while varying the width and depth of the lower rib waveguide. When "WLi" is 11.5 $\mu$m, and "DLi" is 7.5 $\mu$m, a maximum integral value of 0.9889 is obtained. This value corresponds to a coupling loss of 0.05 dB which is a small coupling loss. In this case, the mode of the coupling region exhibits a $1/e^2$ width and a $1/e^2$ depth of the intensity of optical waves respectively corresponding to 10.61 $\mu$m and 10.26 $\mu$m, and an aspect ratio of 1.034.

The conversion region is a region for varying respective widths of the lower and upper rib waveguides in order to transmit, to the rib waveguide of the stabilization region, the optical waves coupled after being inputted to the coupling region. The width of the upper rib waveguide varies from the input-end width $W_{Ui}$ of the mode shape converter to the output-end width $W_{Uf}$ at the output terminal of the mode shape converter connected to the optical device. The width of the lower rib waveguide decreases gradually from $W_{Li}$ to 0 in a longitudinal direction. As a result, the conversion region serves to migrate the optical waves from the lower rib waveguide to the upper rib waveguide.

Figure 9:
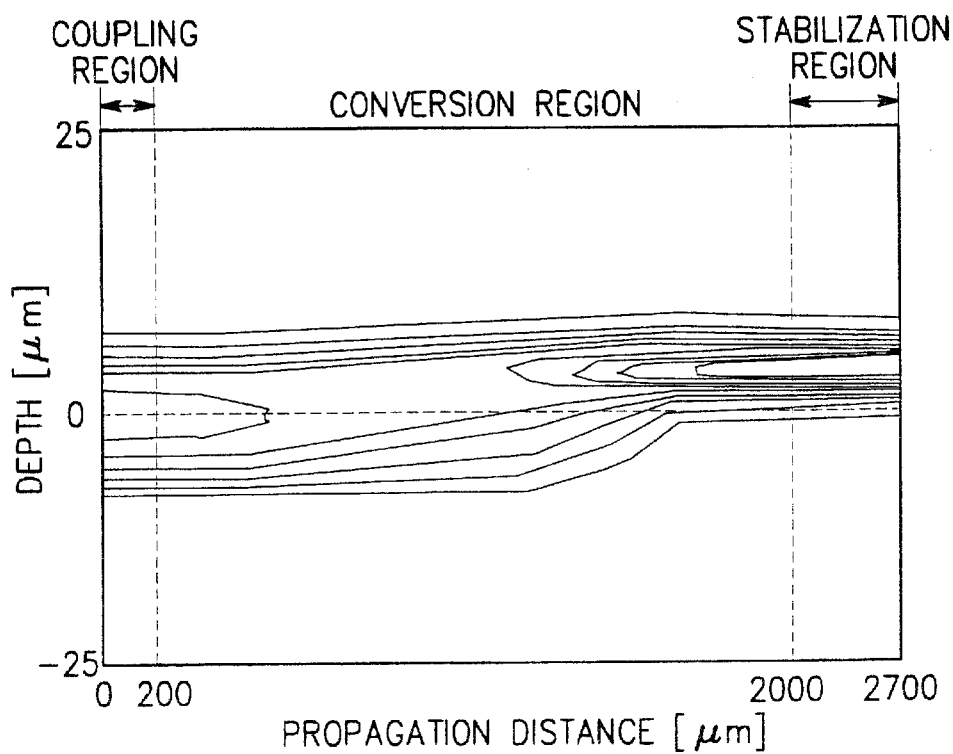
FIG. 9 is a diagram of the results of a simulation conducted in accordance with a three-dimensional beam propagation method, illustrating the operation of a conversion region shown in FIG. 3.

FIG. 9 is a diagram of the results of a simulation conducted in accordance with a three-dimensional beam propagation method, illustrating the operation of the conversion region. In FIG. 9, the dark portion represents regions where a high intensity of light is exhibited.

Referring to FIG. 9, it can be found that the optical waves confined in the lower rib waveguide in the coupling region migrate gradually toward the upper rib waveguide while passing through the conversion region. The optical waves migrated to the upper rib waveguide radiate higher-order modes while passing through the stabilization region. After radiating the higher-order modes, the optical waves are transmitted to the optical device.

Figure 10:
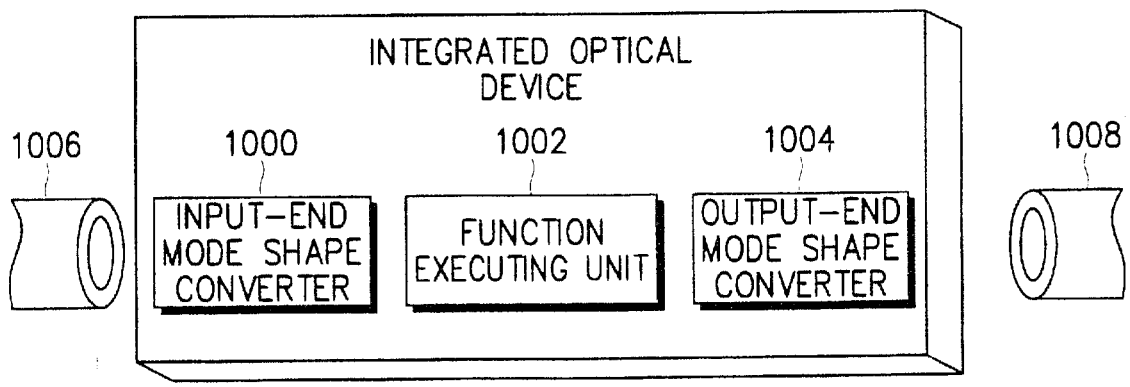
FIG. 10 is a schematic view illustrating an integrated optical device using mode shape converters having a configuration according to the present invention.

FIG. 10 is a schematic view illustrating an integrated optical device using mode shape converters having a configuration according to the present invention. As shown in FIG. 10, the integrated optical device includes an input-end mode shape converter 1000, a function executing unit 1002, and an output-end mode shape converter 1004 having an arrangement reverse to that of the input-end mode shape converter 1000.

The input and output-end mode shape converters 1000 and 1004 are connected to optical fibers 1006 and 1008, respectively. The input-end mode shape converter 1000 converts the mode of an optical wave received from the optical fiber 1006, and then outputs the converted mode to the function executing unit 1002. The functions of the optical device may include, but are not limited to, modulation, switching or filtering of optical waves. The output-end mode shape converter 1004 converts the mode outputted from the function executing unit 1002 into a circular mode which is, in turn, outputted to the second optical fiber 1008. Therefore, the output-end mode shape converter 1004 has an arrangement reverse to that of the input-end mode shape converter 1000 in the integrated optical device.

As apparent from the above description, the core used to fabricate the mode shape converter according to the present invention is made of a single medium. In the mode shape converter of the present invention, the stepped pattern defined by the lower rib waveguide exists partially only in the coupling and conversion regions, thereby simplifying the pattern shape of the upper rib waveguide. Accordingly, the fabrication of the mode shape converter is simplified. The mode shape converter of the present invention provides a high coupling efficiency because the input-end waveguide thereof has a circular mode. Since an up-tapering structure adapted to gradually increase the waveguide width is used for the input-end waveguide, it is possible to reduce the taper length of the waveguide while reducing the transmission loss during the mode conversion.

While the present invention has been particularly shown and described with reference to a particular embodiment thereof, it will be understood by those skilled in the art that various changes in form and detail may be effected therein without departing away from the scope of the invention as defined by the appended claims.

What is claimed is:

1. A mode shape converter interposed between an input or output terminal of a function executing unit included in an optical device and an optical fiber and adapted to couple a mode of the optical fiber with a mode of the input or output terminal of the function executing unit, the mode shape converter comprising:
    a substrate;
    a lower clad coated over the substrate, the lower clad having an etched portion in a desired region;
    a lower rib waveguide formed on the etched portion of the lower clad;
    a core formed over the entire upper surface of both the lower rib waveguide and the non-etched portion of the lower clad;
    an upper rib waveguide formed on the core such that it is aligned with the lower rib waveguide, the upper rib waveguide having a desired shape; and
    an upper clad formed over both the upper rib waveguide and a portion of the core not covered with the upper rib waveguide.

2. The mode shape converter according to claim 1, wherein the lower rib waveguide comprises:
    a coupling region having a mode coupled with the mode of the optical fiber; and
    a conversion region having a width decreasing gradually from the width of the coupling region to zero such that it transmits the mode of the coupling region to the upper rib waveguide.

3. The mode shape converter according to claim 2, wherein the width of the conversion region decreases gradually so that a radiation loss generated during the transmission of the mode from the conversion region to the upper rib waveguide is minimized.

4. The mode shape converter according to claim 2, wherein the coupling region has, at an input end thereof, a cross section having a width and a thickness determined based on the thickness of the upper rib waveguide and the output-end width of the upper rib waveguide such that a coupling efficiency between the mode of the optical fiber and the mode of the coupling region is maximized.

5. The mode shape converter according to claim 2, wherein the upper rib waveguide comprises:
    a coupling region aligned with the coupling region of the lower rib waveguide;
    a conversion region aligned with the conversion region of the lower rib waveguide and adapted to convert the mode transmitted from the lower rib waveguide into a mode suitable for the function executing unit; and
    a stabilization region for outputting the mode transmitted from the conversion region to the function executing unit.

6. The mode shape converter according to claim 5, wherein the coupling region of the upper rib waveguide has an input-end width determined based on the thickness of the core, the thickness of the upper rib waveguide and the output-end width of the upper rib waveguide such that a coupling efficiency between the mode of the optical fiber and the mode of the coupling region in the lower rib waveguide is maximized.

7. The mode shape converter according to claim 5, wherein the width of the coupling region in the upper rib waveguide varies so that a radiation loss generated during the conversion of the mode from the coupling region into the mode suitable for the function executing unit is minimized.

8. The mode shape converter according to claim 1, wherein the upper rib waveguide, the core, and the lower rib waveguide are made of the same material.

9. A method for fabricating a mode shape converter interposed between an input or output terminal of a function executing unit included in an optical device and an optical fiber and adapted to couple a mode of the optical fiber with a mode of the input or output terminal of the function executing unit, said method comprising the steps of:
    (a) coating a lower clad over a substrate;
    (b) patterning an etch mask on the lower clad, and etching the lower clad to a desired depth using the resultant pattern of the etch mask;
    (c) coating a core material over the entire upper surface of the etched lower clad to form a lower rib waveguide and a core;
    (d) patterning another etch mask on the core, and etching the core using the resultant pattern of the another etch mask to form an upper rib waveguide; and
    (e) coating an upper clad on the core and the upper rib waveguide.

10. The method according to claim 9, wherein the patterns respectively formed at the steps (b) and (d) are determined based on parameters determined to maximize a coupling efficiency between the input-end mode of the mode shape converter and the mode of the optical fiber.

11. The method according to claim 10, wherein the width of each of the patterns varies so that a radiation loss generated during a conversion of the input-end mode of the mode shape converter into a mode suitable for an operation of the function executing unit is minimized.

12. An integrated optical device including a function executing unit coupled to optical fibers at input and output terminals thereof, respectively, a first mode shape converter arranged at the input terminal of the function executing unit and adapted to convert an input optical fiber mode into a mode suitable for execution of desired functions of the optical device, and a second mode shape converter arranged at the output terminal of the function executing unit and adapted to convert a mode outputted from the function executing unit into an optical fiber mode, the output-end mode shape converter having an arrangement reverse to that of the first mode shape converter, wherein each of the first and second mode shape converters comprise:
    a substrate;
    a lower clad coated over the substrate, the lower clad having an etched portion in a desired region;
    a lower rib waveguide formed on the etched portion of the lower clad;
    a core formed over the upper surfaces of both the lower rib waveguide and a non-etched portion of the lower clad;
    an upper rib waveguide formed on the core such that it is aligned with the lower rib waveguide, the upper rib waveguide having a desired shape; and an upper clad formed over both the upper rib waveguide and a portion of the core not covered with the upper rib waveguide.

13. The integrated optical device as set forth in claim 12, wherein the lower rib waveguide of the first and second mode shape converters comprise:

a coupling region having a mode coupled with the mode of the optical fiber; and a conversion region having a width decreasing gradually from the width of the coupling region to zero such that it transmits the mode of the coupling region to the upper rib waveguide.

14. The integrated optical device as set forth in claim 13, wherein the upper rib waveguide of the first and second mode shape converters comprise:

a coupling region centrally aligned with the coupling region of the lower rib waveguide, said coupling region of said lower rib waveguide having a width greater than a width of said coupling region of said upper rib waveguide;

a conversion region centrally aligned with the conversion region of the lower rib waveguide and adapted to convert the mode transmitted from the lower rib waveguide into a mode suitable for the function executing unit, wherein the width of the conversion region of the lower rib waveguide decreases gradually to zero; and a stabilization region for outputting the mode transmitted from the conversion region of the lower rib waveguide to the function executing unit, wherein the width of the stabilization region is less than the width of the coupling region of the lower rib waveguide and greater than the width of the coupling region of the upper rib waveguide, and wherein the width of the conversion region of the upper rib waveguide increases gradually from the coupling region of the upper rib waveguide to a width equal to the width of the stabilization region prior to reaching said stabilization region.

15. The integrated optical device as set forth in claim 14, wherein the width of the conversion region of the lower rib waveguide of each of the first and second mode shape converters decreases gradually so that a radiation loss generated during the transmission of the mode from the lower rib waveguide to the upper rib waveguide is minimized.

16. The integrated optical device as set forth in claim 12, wherein the upper rib waveguide, the core, and the lower rib waveguide of each of the first and second mode shape converters are made of the same material.

17. The integrated optical device as set forth in claim 12, wherein the function executing unit has one of a modulation function, a switching function and filtering function.

18. The integrated optical device as set forth in claim 12, wherein the lower rib waveguide and upper rib waveguide form a double rib waveguide such that the lower rib waveguide has a width and a depth adjusted to allow the fundamental mode of the double rib waveguide to well coincide with a circular mode of the optical fiber.

* * * * *